INVENTORS
Cyril R. Rhatican
Roger Walwark
BY H. L. Gammons
AGENT

INVENTORS
Cyril R. Rhatican
Roger Walwark
BY H. L. Gammons
AGENT

United States Patent Office 3,453,412
Patented July 1, 1969

3,453,412

APPARATUS FOR PRODUCING PROPORTIONED ADMIXTURES OF GASEOUS COMPONENTS

Roger Walwark, Shrewsbury, and Cyril R. Rhatican, Sayreville, N.J., assignors to National Lead Company, New York, N.Y., a corporation of New Jersey Filed Dec. 15, 1966, Ser. No. 602,099
Int. Cl. F22b *1/28*
U.S. Cl. 219—271 3 Claims

ABSTRACT OF THE DISCLOSURE

An apparatus for producing a proportioned homogeneous mixture of a metal halide vapor and air comprising a structure defining a first feed-means including a liquid metering device arranged to feed a metal halide liquid at a predetermined rate to a vapor chamber, said vapor chamber comprising a cylindrical shell having a metal receptacle disposed therein and an electrical resistance heater element surrounding the receptacle. The receptacle is provided with a loose voluminous mass of material disposed therein and an outlet defining a first vapor feed means communicating with a vapor mixing chamber. A second vapor feed means is provided in communication with the mixing chamber to effect a homogeneous mixture of the vapors prior to discharging the same.

BACKGROUND OF THE INVENTION

The invention, as defined in the claims, pertains to the fields of art relating to gaseous compositions and optics the latter being pertinent to the use of the invention as hereinafter described.

There are many instances in industry today in which proportioned mixtures of gases or vapors are required. The chemical industry is one and other instances can be found in processes for applying vaporous materials to articles for purposes of improving their electrical properties, wetting characteristics, scratch resistance, surface reflectance and similar applications. A particular industry in point is the glass making industry and more especially the manufacture of glass containers, i.e. glass tableware, chemical glass-ware, bottles, and the like wherein a highly dilute vaporous material is applied to a heated glass surface to improve its scratch resistance and/or lubricity. The particular vaporous materials selected will depend upon the properties desired and in general inorganic or organic compounds of titanium, zirconium, tin, silicon and the like are used, the halides of titanium being especially useful. Also only extremely small amounts of these materials are used and hence it is the practice to apply the selected material in the form of very dilute mixtures with air. In this connection attempts by the glass industry to develop equipment for producing a dilute admixture of vaporous $TiCl_4$ and air have met with serious production problems. This has been due primarily to the presence of water vapor in the air which, despite prior techniques for excluding it, is invariably present in sufficient amounts to react with the $TiCl_4$ vapor and form a gelatinous oxychloride substance which quickly plugs up and/or corrodes the feed lines and valves of the vaporizing equipment and renders it inoperable.

SUMMARY OF THE INVENTION

The present invention relates to improved apparatus for producing proportioned admixtures of gaseous components in a manner to preclude malfunctioning of the apparatus due to presence of moisture in one or more of the components, the invention being characterized by two or more sources of vapor, at least one of which comprises an improved flash vaporizer for converting a liquid substantially instantaneously and in toto to a gas or vapor, in combination with a vapor mixing chamber the latter being designed both to mix the proportioned vapors fed into it and to separate and remove from the admixed vapors any solid or gelatinous reaction products that may be formed due to the presence of moisture in one or more of the gases.

The invention further contemplates the use of this vaporizing apparatus as an improvement over presently known methods for applying dilute vaporous materials to articles for modifying the surface characteristics thereof.

DESCRIPTION OF PREFERRED EMBODIMENT

Figure 1:
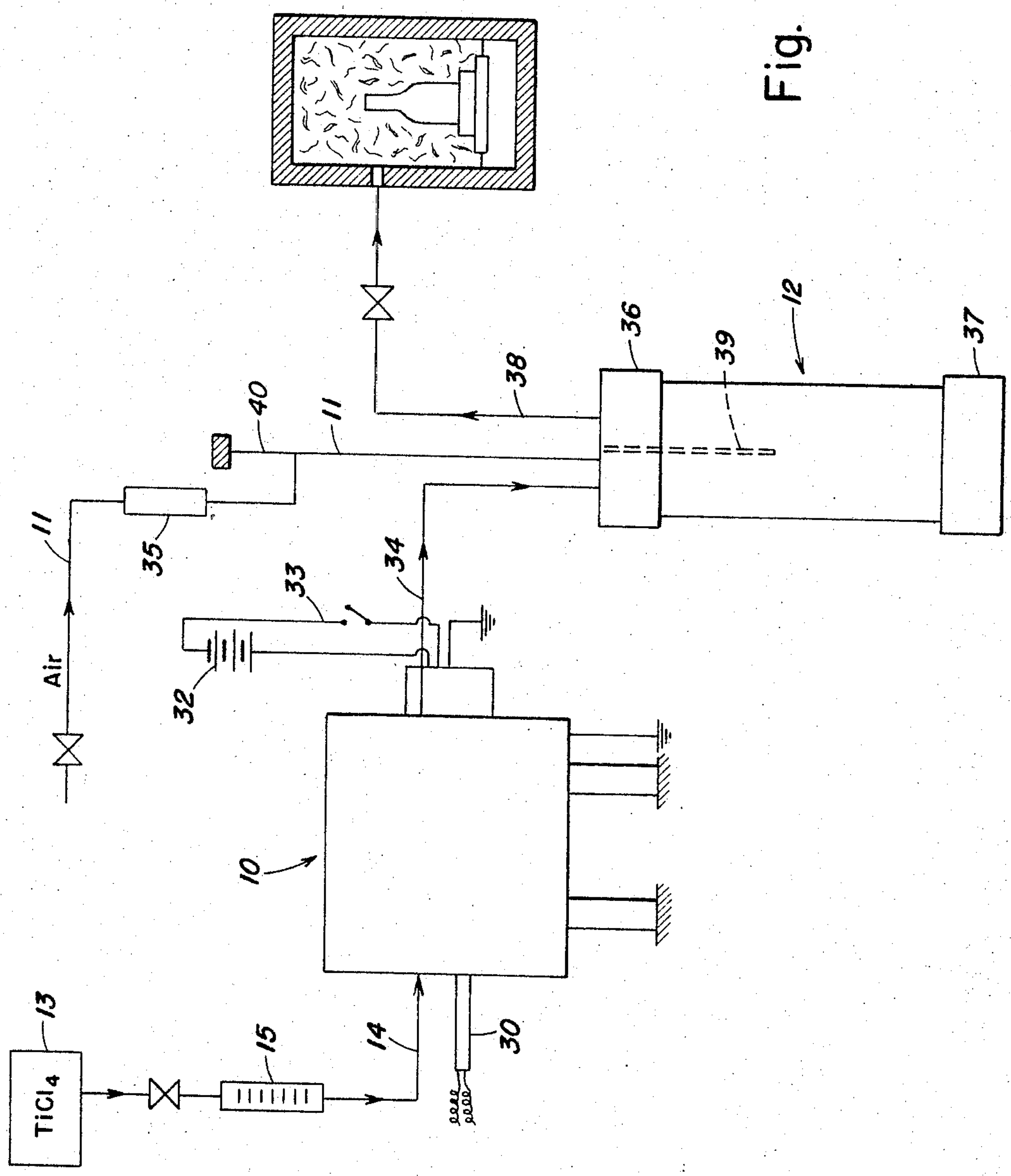
FIG. 1 is a schematic view of the vapor proportioning means of this invention shown as used in conjunction with equipment for applying a dilute vaporous material to an article.

Referring to the drawings the vapor proportioning means of this invention comprises, in the main, vaporizing means 10 hereinafter referred to as a flash vaporizer, a second source of vapor indicated by pipe-line 11, and a vapor mixing chamber 12. A liquid to be vaporized is adapted to be fed to the flash vaporizer 10 from a source indicated schematically at 13 via feed-means 14 which is shown provided with metering means 15 for regulating the rate of flow of the liquid from source 13 to the vaporizer 10. The force used to transfer the liquid from the source 13 to the vaporizer 10 may be gravity or a suitable pump as the circumstances may require.

Figure 2:
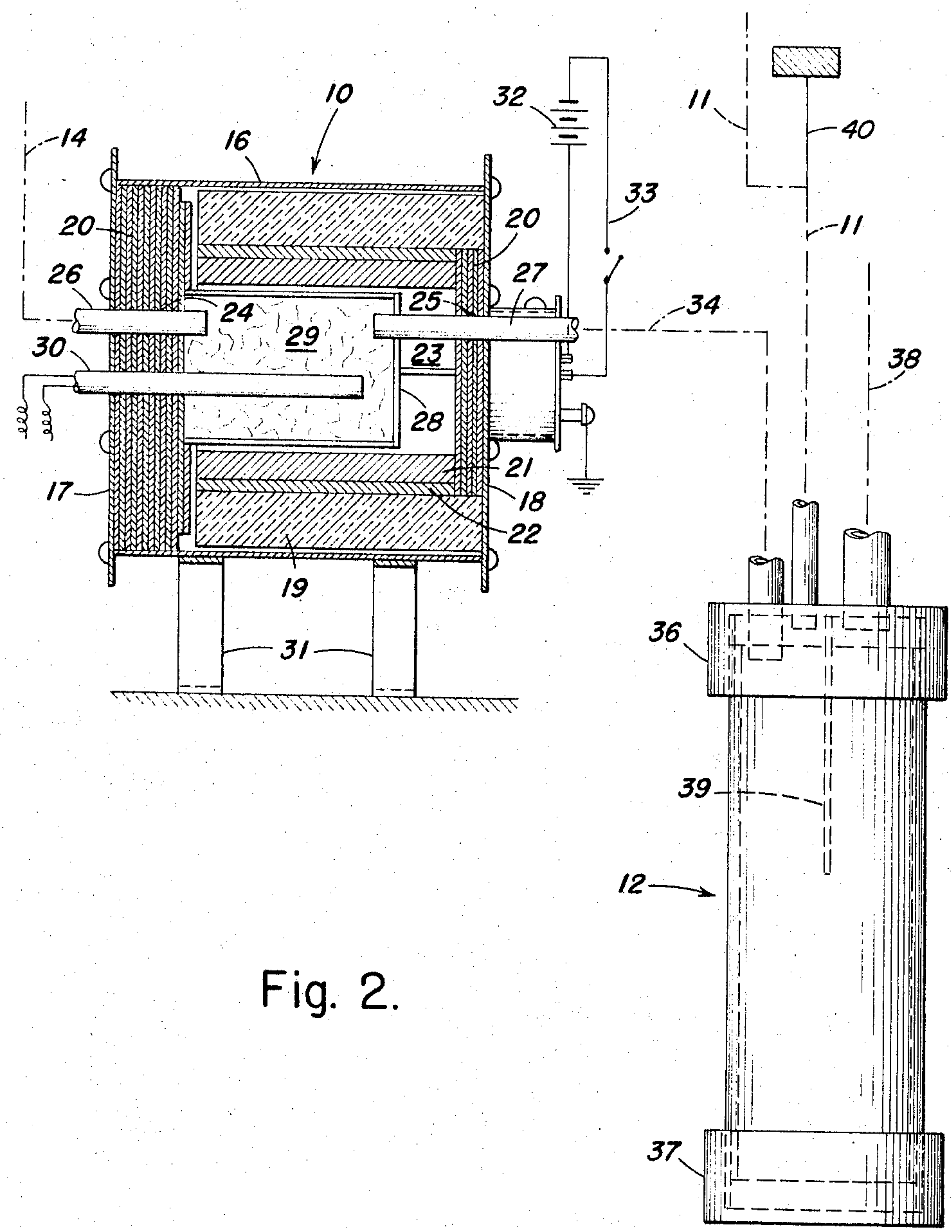
FIG. 2 is an enlarged vertical elevation partly in section, of the vapor proportioning means shown in FIG. 1.

The rate of flow of the liquid is adapted to be a measure of the vapor being generated in the vaporizer and hence the liquid entering the vaporizer 10 is adapted to be volatilized substantially instantaneously and in toto. To these ends the vaporizer 10 comprises an outer cylindrical shell 16, see especially FIGURE 2, having disc shaped end-plates 17 and 18 respectively secured to the corresponding ends thereof by screws or equivalent fastening means. The walls of the cylindrical shell 16 are lined with suitable heat insulating material 19 while its opposite ends are insulated by multiple layers of asbestos sheet material 20—20. The aforesaid heat insulating lining 19 is adapted to form a cylindrical recess in which is assembled an electrical heating unit. The latter is of the type available commercially and comprises a single cylindrical ceramic element 21, or two semi-cylindrical elements, as the circumstances may require, having a plurality of turns of a high electrical resistance wire embedded therein; and wrapped with asbestos tape 22 the O.D. of the heating unit being such as to make a snug fit wtihin the heat insulating lining 19. The I.D. of the cylindrical heating units is sufficient to provide a concentric plenum chamber 23 having an inlet 24 at one end and an outlet 25 at its opposite end. A pipe-nipple 26 of the feed-pipe 14 is fitted in the chamber inlet 24 while a pipe-nipple 27 is fitted in the chamber outlet 25 for connection to the vapor mixing chamber 12 described more fully below.

Mounted within the plenum chamber 23 is a metal receptacle 28 having an inlet coaxial with and adapted to accommodate the inner end of the pipe-nipple 26; and an outlet coaxial with and adapted to accommodate the inner end of the pipe-nipple 27, the pipe-nipples 26 and 27 being substantially directly opposite each other. Within the metal receptacle 28 is a loose, voluminous mass of material 29 which substantially fills the receptacle and shrouds the inner ends of the pipe-nipples 26 and 27 respectively. The loose, voluminous material 29 may be any suitable material that will provide a large surface area and retain heat. Suitable materials may be ceramic or glass beads, pebbles, coarse sand, metal shavings and the like, the preferred material being metal turnings derived from a metal which is highly resistant to corrosion at high temperatures such as, for example, a nickel alloy commonly known as Inconel.

Since it is desirable to maintain a constant check on the temperature within the metal receptacle 28 during operation of the vaporizer the latter is provided with a thermocouple well 30, which extends through the insulation 20 at one end of the vaporizer and into the mass of metal turnings 29 in the metal receptacle 28.

The vaporizer 10 is adapted to be supported on a fixed surface by suitable mounting brackets 31—31 secured to the cylindrical shell 16.

The vaporizer is adapted to be heated by electrical energy supplied from a source indicated schematically at 32 connected by leads 33 to the heating element 21. From the disclosure thus far it will be evident that when electrical energy is supplied to the heating element 21 from the supply source 32 the heating element 21 will transmit heat to the metal receptacle 28 and hence to the metal turnings 29 therein. Thus the latter becomes, in effect, a heat sump of large surface area substantially completely filling the interior of the metal receptacle 28 and as a consequence when a liquid is fed into the metal receptacle 28 via the inlet pipe-nipple 26 it will invariably contact a heated surface and be volatilized substantially instantaneously and in toto. The resulting vapors pass out of the receptacle 28 via the outlet pipe-nipple 27 which, as shown schematically in FIG. 1, is connected by pipeline 34 to the vapor mixing chamber 12.

Turning now to the second vapor supply source 11 referred to above, the latter may be similar to the vaporizer 10 hereinabove described or may be simply a gas supply line such as for example an air line such as shown in FIG. 1. This second vapor feed line is provided with metering means 35 for controlling the flow rate of the air through the pipeline which, as shown especially well in FIG. 2, enters the top of the vapor mixing chamber 12 in juxtaposition to the first vapor feed-line 34.

The vapor mixing chamber serves both to effect a uniform admixture of the vapors being fed into it from the feed-lines 11 and 34 and also to separate and remove from the admixed vapors any solid or gelatinous products that may have been formed due to the presence of moisture in one or both of the vapors. To these ends the mixing chamber 12 comprises a cylindrical shell having top and bottom end-closures 36 and 37 respectively the latter being removable for cleaning out the chamber 12 periodically or as the circumstances may require. The top end-closure 36 is provided with inlets for the two vapor lines 11 and 34 both inlets entering the top end-closure 36 adjacent one edge thereof. An outlet is provided in the top end-closure 36 adjacent the opposite edge thereof in which is secured pipe-line 38 for discharging the mixed vapors from the mixing chamber. Secured to or otherwise supported adjacent the underside of the top end-closure 36 is vertically disposed baffle-means 39 comprising an imperforate plate located substantially at the center of the top end-closure 36, i.e. mid-way of the two inlets and the outlet thereof, and extending downwardly in the mixing chamber a distance corresponding to substantially half its depth. The baffle-means 39 thus precludes the incoming vapors from short-circuiting to the outlet thus causing the incoming vapors to be brought together and form a uniform admixture of the vapors before being discharged from the mixing chamber. Further, in so far as the baffle-means prevents short-circuiting of the vapors, the retention time of the latter in the mixing chamber is extended as a consequence of which any solid or gelatinous products formed in the vapor mixture due to the presence of moisture are precluded from being carried out of the discharge outlet and, as a consequence, are separated from the admixture of vapors and collected in the chamber.

Further in connection with the formation of solid or gelatinous substances it has been found that when the vapor line 11 is used to introduce air into the mixing chamber some solid or gelatinous material may be deposited in the vapor line 11 at or immediately adjacent the mouth thereof. Hence it has been found expedient to provide the vapor feed line 11 with a ramrod 40 which may be operated manually, periodically, to remove any solid or gelatinous deposits from the vapor feed line 11.

As indicated at the outset the above described apparatus is adapted to produce proportioned admixtures of moisture-free and solids-free vapors and in particular air-diluted vaporous $TiCl_4$ for treating glassware as indicated schematically in FIGURE 1. The particular techniques used for treating glass articles of this nature does not form a part of this invention but disclosures thereof may be found in U.S. patents classified in Class 88 Subclass 105 of the U.S. Patent Office one of the earliest of which is U.S. 2,478,817 Gaiser, Aug. 9, 1949.

To further illustrate the invention, a series of runs were made using the apparatus shown schematically in FIG. 1 wherein the settings of the metering-means of the air flow and liquid $TiCl_4$ flow respectively were adjusted so as to provide various proportions of air to vaporous $TiCl_4$. By these metering-means air flow rates were adjusted over a range of from 3.0 to 7.0 s.c.f.m. and the $TiCl_4$ flow rates over a range from 0.15 to 1.8 lbs./hr.

At startup all valves of the system were closed, the ramrod 40 was moved into its "up" position and the tank 13 was filled with liquid $TiCl_4$. Before opening the valve in the liquid $TiCl_4$ feed line the electric current was supplied to the heating unit to heat the plenum chamber 23 and in particular the metal turnings in the receptacle 28 to a temperature in the range of from 475 to 650° F. The valve between the mixing chamber 12 and the glass treating apparatus was then opened after which the valve in the liquid $TiCl_4$ feed line was opened whereupon liquid $TiCl_4$ was fed into the vaporizer and converted to vaporous $TiCl_4$. The vaporous $TiCl_4$ passed from the vaporizer into the vapor mixing chamber where it was admixed with the air in the proportions determined by the metering-means, the proportioned vapor mixture then flowing to the glass treating equipment. To test the efficacy of the mixing chamber one run was made without the mixing chamber, i.e., by connecting the $TiCl_4$ vapor line 34 directly into the air line 11; and one run with the mixing chamber, as hereinabove described. Both runs were made with air that would normally be regarded as dry and in both runs sufficient moisture entered the system to react with the $TiCl_4$ and form a gelatinous deposit. In the run made without the mixing chamber the junction of the air and vaporous $TiCl_4$ feed lines soon plugged and rendered the equipment inoperable. In contradistinction the system employing the mixing chamber was unaffected by the gelatinous deposits which were separated and removed from the vaporous gas mixture in the manner hereinabove described. Using the apparatus of the invention glass bottles have been successfully coated continuously for extended periods of time with no malfunctioning of any kind.

The invention may be carried out in other specific ways than these herein set forth without departing from the spirit and essential characteristics of the invention and the present embodiment is therefore to be considered in all respects as illustrative and not restrictive, and all changes coming within the meaning and equivalency range of the appended claims are intended to be embraced therein.

What is claimed is:

1. Apparatus for producing a proportioned homogeneous mixture of a metal halide vapor and air comprising in combination: liquid vaporizing means comprising a heat-insulated chamber and heating-means in said chamber, feed-means including a liquid metering device arranged to feed a metal halide liquid at a predetermined rate to the vaporizing chamber, the said heating-means in said vaporizing chamber being constructed and arranged to convert said liquid metal halide substantially instantaneously and in toto to a metal halide vapor, vapor mixing means comprising a chamber arranged exteriorly of said vaporizing chamber and provided with an outlet, first vapor feed-means arranged to deliver the metal halide vapor from said vaporizing chamber into said vapor mixing chamber, a second vapor feed-means including a vapor metering device arranged to feed an oxygen-containing gas at predetermined rate into said vapor mixing chamber, baffles in said vapor mixing chamber arranged between said mixing chamber outlet and the inlets of said metal halide vapor and said gas, respectively, to effect a homogeneous mixture of the metal halide vapor and gas within said mixing chamber prior to discharging the mixed vapors from the outlet thereof.

2. Apparatus for producing a proportioned homogeneous mixture of a metal halide vapor and air comprising in combination: liquid vaporizing means comprising a heat-insulated chamber and heating-means in said chamber, feed-means including a liquid metering device arranged to feed a metal halide liquid at a predetermined rate to the vaporizing chamber, the said heating-means in said vaporizing chamber being constructed and arranged to convert said liquid metal halide substantially instantaneously and in toto to a metal halide vapor, vapor mixing means comprising a chamber arranged exteriorly of said vaporizing chamber and provided with an outlet, first vapor feed-means arranged to deliver the metal halide vapor from said vaporizing chamber into said vapor mixing chamber, a second vapor feed-means including a vapor metering device arranged to feed air at a predetermined rate into said vapor mixing chamber, line clearing-means comprising a ram-rod arranged in said second vapor-feed means for removing obstructions therefrom, baffles in said vapor mixing chamber arranged between said mixing chamber outlet and the inlets of said metal halide vapor and said air, respectively, to effect a homogeneous mixture of the metal halide vapor and air within said mixing chamber prior to discharging the mixed vapors from the outlet thereof.

3. In apparatus for applying a proportioned homogeneous mixture of titanium tetrachloride vapor and air to glass articles to alter the surface characteristics thereof the improvement comprising in combination: liquid vaporizing means comprising a heat insulated chamber and heating-means in said chamber, feed-means including a liquid metering device arranged to feed liquid titanium tetrachloride at a predetermined rate to the vaporizing chamber, the said heating-means in said vaporizing chamber being constructed and arranged to convert said liquid titanium tetrachloride substantially instantaneously and in toto to a vapor, vapor mixing-means comprising a chamber arranged exteriorly of said vaporizing chamber and provided with an outlet, first vapor feed-means arranged to deliver the titanium tetrachloride vapor from said vaporizing chamber into said vapor metering device arranged to feed air at a predetermined rate into said vapor mixing chamber, said vapor mixing chamber being constructed with baffles arranged between said mixing chamber outlet and the inlets of said titanium tetrachloride vapor and air, respectively, to effect a homogeneous mixture of said vapor and said air within said mixing chamber prior to discharging said mixture from the outlet thereof and feed-means arranged to convey the proportioned homogeneous mixture of titanium tetrachloride vapor and air from the outlet of said mixing chamber to said glass articles.

References Cited

UNITED STATES PATENTS

| | | | |
|---|---|---|---|
| 1,456,986 | 5/1923 | Leisten et al. | 48—103 |
| 2,127,880 | 8/1938 | Medsker | 48—103 X |
| 2,186,152 | 1/1940 | Seitz | 261—94 |
| 2,334,926 | 11/1943 | Hines et al. | 48—103 X |
| 2,446,309 | 8/1948 | Starr | 48—103 X |
| 2,789,062 | 4/1957 | Cusano et al. | 117—33.5 |
| 2,805,921 | 9/1957 | Schaumann | 23—202 |
| 2,982,528 | 5/1961 | Shelton | 48—103 X |
| 3,055,750 | 9/1962 | De Carolis | 48—103 |
| 3,107,719 | 10/1963 | Buckley | 158—53 |
| 3,188,230 | 6/1965 | Bakish et al. | 118—48 X |

ANTHONY BARTIS, *Primary Examiner.*

C. L. ALBRITTON, *Assistant Examiner.*

U.S. Cl. X.R.

118—49.5; 219—275; 261—95, 142